United States Patent [19]
Nobis

[11] 4,438,657
[45] Mar. 27, 1984

[54] SHIFT DEVICE FOR THE DRIVE OF A UTILITY VEHICLE

[75] Inventor: Dieter Nobis, Mannheim, Fed. Rep. of Germany

[73] Assignee: Deere & Company, Moline, Ill.

[21] Appl. No.: 302,327

[22] Filed: Sep. 15, 1981

[30] Foreign Application Priority Data

Nov. 25, 1980 [DE] Fed. Rep. of Germany ....... 3044311

[51] Int. Cl.³ .......................... G05G 9/16; G05G 5/10
[52] U.S. Cl. .................................... 74/477; 74/473 R
[58] Field of Search ............................ 74/473 R, 477

[56] References Cited

U.S. PATENT DOCUMENTS 2,772,652 12/1956 Du Shane et al. ................ 74/477 X
2,775,134 12/1956 Swenson ........................... 74/477 X
3,270,826 9/1966 Middlesworth et al. ............. 180/75
3,993,175 10/1974 Beveridge .......................... 192/3.57

FOREIGN PATENT DOCUMENTS 1729967 7/1956 Fed. Rep. of Germany .
1530903 2/1970 Fed. Rep. of Germany .
1750088 1/1971 Fed. Rep. of Germany .
2547563 4/1976 Fed. Rep. of Germany .
 919570 2/1963 United Kingdom .

Primary Examiner—Allan D. Herrmann

[57] ABSTRACT

A gear change mechanism for a tractor is designed so that a single shift lever only is used both for gear and "Hi-lo" selection. When the lever is in a gear selected position, it can be swung sideways, bringing with it its associated pivotally mounted shift lever quadrant (12) to make the "Hi-lo" change. A stop (26, 26a) is provided to prevent such a change in neutral.

9 Claims, 3 Drawing Figures

SHIFT DEVICE FOR THE DRIVE OF A UTILITY VEHICLE

BACKGROUND OF THE INVENTION

The invention relates to a shift device for the drive of a utility vehicle, in particular an agricultural tractor, the shift lever of which is used for shifting a multi-stage transmission, in particular a stepped gear change transmission, and additionally has a further change-over shift function which can be used in all ranges or stages, in particular for a load shift stage, wherein the shift lever, which is mounted pivotally in two directions, can be brought into and out of engagement with the shift segments which act on the transmission by way of further shift members (for example, angle lever, linkage, shift shafts), and use thereof for installation in a utility or working vehicle, in particular an agricultural tractor.

In the art of agricultural vehicles, in particular in agricultural tractors, drive shift devices are known which have two shift levers which are arranged adjacent to each other and of which one serves as the so-called gear or stage shift lever, for example, three or four speed stages, (forward or reverse), while the other serves as a range or group shift lever for one or more forward ranges and reverse range. Then, for example, when there are two forward ranges, this arrangement gives eight speed stages forward and four speed stages in reverse. In the course of providing vehicles with increased drive comfort and optimum adaptation to the grond or travelling and working conditions, such vehicles may additionally be provided with a so-called fast-slow change-over shift function which can be shifted under load, whereby, with a reduction in speed of, for example, 20%, the traction force may be increased in the corresponding gear stage by, for example, 25-30%, and vise-versa. The above-mentioned function has hitherto been performed with an additional shift lever which is generally arranged on the steering wheel and which from there acts, by means of a separate linkage arrangement, on hydraulic valves of the planetary transmission associated with the main transmission.

Analysis of the experience which has been acquired in dealing with vehicles provided with such shift arrangements shows that further combining, in particular, shift and/or clutch functions in a single shift lever, affords considerable advantages from the point of view of operation. This applies, in particular, in regard to integration of the above-discussed fast-slow function for two speeds of rotation, with the gear shift lever.

The present invention is therefore based on the problem of providing a shift device of the above-indicated kind, wherein the novel simplification in operation is to be achieved in a cost-effective and also robust and low-maintenance manner. The shift device should be of such a nature that, in use thereof, it can be disposed in a space-saving manner and in such a manner that it can be comfortably and conveniently gripped, in particular in the vicinity of the side wall of a driving cabin.

SUMMARY OF THE INVENTION

This problem is solved in that the shift lever which, for shifting three or four stages, is positively guided in a shift bracket having an h-shaped or H-shaped shift gate, respectively, is pivotal, including the shift bracket, in all three or four shift positions, but not in the neutral position, parallel to the direction of the transverse portion of the h-shape or H-shape, for producing the additional change-over shift function.

The main function envisaged in respect of the shift lever is primarily gear stage shifting, that is to say, for preferably four transmission stages. A further range shift lever is then required for shifting, for example, two forward ranges I and II, and a reverse range. However, the main function may also be designed in the same manner as the usual gear shift, for example, for passenger vehicles with one reverse gear and, for example, three forward gears.

The additional change-over shift function which, in accordance with the invention, is integrated into the shift lever for the main function, may relate, in particular, to a two-stage function, fast-slow, for example, in regard to the speed of rotation or drive speed. In principle, however, this may possibly also relate to a different function, for example, clutch engagement, clutch disengagement, or forward-reverse, if it appears desirable for such a subsidiary function to be performed with the shift lever which is used for agiven main function.

As regards the features required for embodying the concept according to the invention, a shift lever which is movable in two directions, for example, by means of a cardanic mounting arrangement, is part of the art in connection with conventional gear shift arrangements and likewise the associated shift segments which are of a claw configuration, and the further shift members (see, for example, U.S. Pat. No. 3,270,826.

U.S. Pat. No. 3,993,175 also discloses a control lever arrangement for multi-functional actuation for the drive of a crawler tractor. When the lever is pivoted sideways in a slot, forward gear-neutral-reverse gears are selected by way of a shift control valve which actuates the hydraulic load shift and reversing transmission. When the lever is pivoted in the direction of travel, that is to say, forwardly and backwardly, a second hydraulic control valve is actuated in the forward or reverse range and that valve changes the speed of rotation to give a higher or lower speed. When the shift lever is pivoted in the manner just mentioned, the shift bracket with the slot shift gate also pivots in order to simultaneously act on a cam disc by means of a guide pin member which is mounted on one side. Therefore, the purpose and the arrangement of this dual-function shift lever and bracket does not have any extensive points in common with the invention.

In a preferred embodiment of the shift device, the h-shaped or H-shaped shift gate is oriented approximately in the direction of travel so that the transverse portion of the h-shaped or H-shaped gate extends substantially parallel to the direction of the wheel axle, as is conventional in the normal gear shift arrangement of passenger vehicles.

In addition, the shift bracket is preferably of a substantially U-shaped configuration and the h-shaped or H-shaped recess or gate is disposed in its approximately horizontally extending upper portion while the shift bracket is mounted pivotally in mounting axis means at the lower end of the two downwardly pointing limb portions. Preferably, the mounting axis of the shift bracket and one pivot mounting of the shift lever are disposed on a common line of alignment which is preferably oriented approximately horizontally in the direction of travel.

Further advantageous embodiments of the invention are characterized in the subsidiary claims.

The scope of the present invention also includes the use of the above-indicated shift device for installation in a utility or working vehicle, in particular in an agricultural tractor, wherein the shift lever is arranged on the right-hand side and in front of the driving seat at a convenient height for gripping it, and the shift linkage is taken in a casing which is close to the wall, downwardly through the driving platform, where it acts on the shift shafts which are extended substantially horizontally towards the right-hand side from the transmission housing.

Such a use is provided, in particular, for the situation where the shift lever, in its main function, serves as a stage shift lever for shifting a three or, in particular, four stage gear change transmission and, in its additional change-over shift function mode, shifts a planetary transmission which can be shifted under load into two different ranges of speed of rotation (fast/slow). In this construction, it is provided that installation is in combination with a group shift lever for shifting ranges (for example, forward I, forward II, reverse), wherein both shift levers and the further shift members (segments, linkage means, shift shafts) are arranged in spatially close proximity and are taken to the transmissions through the floor of the driving platform.

The above-mentioned use, according to the invention, permits an arrangement which is particularly convenient from the point of view of operation, as is of considerable significance, in particular, in regard to agricultural tractors. In addition, however, the shift device, according to the invention, in its various embodiments, can be used for many other use situations and utility or working vehicles in which there is a requirement for actuating a number of functions with one shift lever.

DETAILED DESCRIPTION

Figure 1:
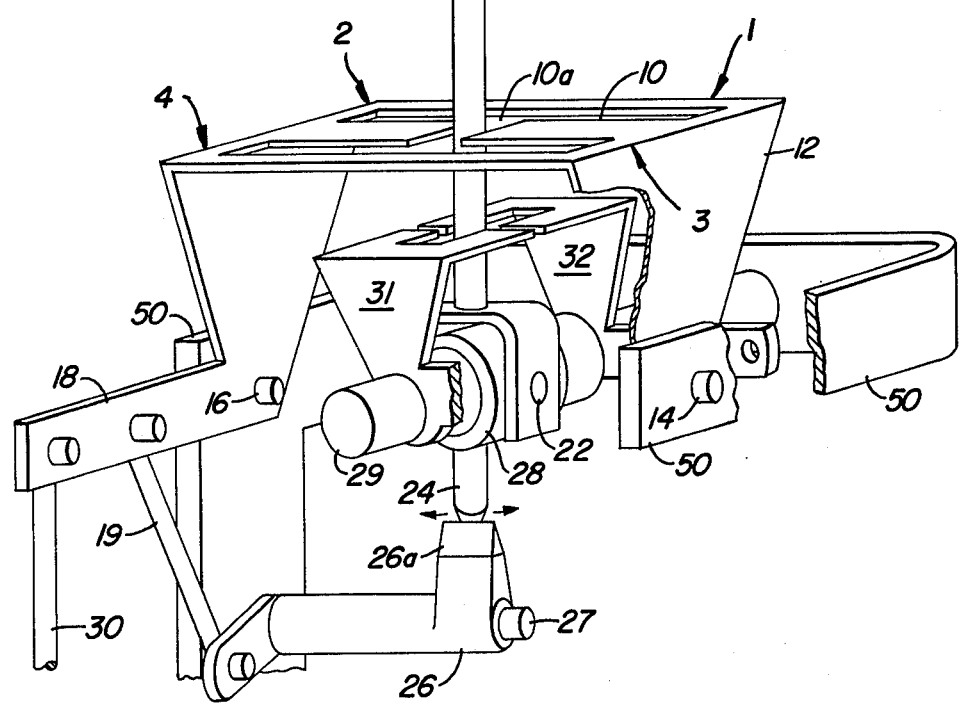
FIG. 1 shows a perspective view of the shift device, in particular the arrangement of the shift lever and the shift bracket.

FIG. 1 shows a perspective view of the shift device, in particular the shift lever and the shift bracket arrangement. The shift bracket, which is denoted by reference numeral 12, is substantially of U-shaped configuration, with the two limb portions being tapered downwardly towards the mounting spindles 14 and 16. The substantially horizontally extending upper portion of the shift bracket 12 has an H-shaped recess or shift gate or guide slot 10 in which the shift lever 20 is positively guided. The shift lever 20 is pivotally supported at the pivot mounting 22 which forms a line of alignment with the mounting spindles 14 and 16 of the shift bracket. The additional change-over shift function is also affected by further pivotal movement in that line of alignment. In addition, the shift lever 20 is also pivotal about the mounting pin 29 by way of the mounting element 28 which, for example, as shown, can be in the form of a mounting sleeve. Thus, the pivot mounting 22 and the mounting pin cooperate to form a universal or cardanic mounting for the shift lever 20. The mounting pin 29 also carries the two shift segments 31 and 32. The shift segments are of the usual claw or dog configuration which is open towards the shift lever 20 so that the shift lever, depending on its direction of movement, can engage into and pivot the left-hand or the right-hand shift segment 31 or 32 as soon as the shift lever is moved out of the neutral position into the gear stage positions. The lever arms which are formed or mounted on the shift segments and which, in turn, are connected to the shift linkage, are only partly visible. A conventional arrangement may be used. Likewise, the cardanic mounting of such a shift lever, being movable in two directions, is also known. It may be in the form illustrated or a different form. The mounting pin 29 may be secured in the two oppositely disposed sides of the mounting frame structure 50 which is in the form of a square or rectangle, with the mounting spindles 14 and 16 at the other two opposite sides. The mounting frame structure 50 is shown in a broken-away view, in order to give a clear view on to the one lever arm which is disposed behind the frame structure 50 of the shift segment 32. The associated shift linkage is not shown. The front limb portion of the shift bracket 12 is also shown as being broken away, in order to give a clear view on to the two shift segments 31 and 32. Then, the mounting frame structure 50 is also shown broken away in the front region, in order to be able to show not only the cardanic mounting of the shift lever 20 but also a means for preventing selection of the additional change-over shift function by pivoting the shift lever 20, including the shift bracket 12, when in the neutral position. For this purpose, an upwardly pointing locking element 26 is mounted below the pivot mounting 22, parallel to the direction of the transverse portion 10a of the H-shaped gate, in the mounting means 27. The mounting pin 27 for the locking element 26 can be anchored downwardly, for example, in an extension portion of the mounting frame structure 50. The locking element 26 is pivotal in dependence on the shift bracket 12 insofar as it is connected to the lever arm 18 by way of a bar 19. Associated with the locking element is a cooperating pin or bolt member 24 which, in turn, is secured to the mounting element 28. The form and arrangement of the two members 24 and 26 are such that in the neutral position of the shift lever 20, the shift bracket 12 is locked against clockwise or counterclockwise pivotal movement, respectively, as the cooperating bolt member 24 comes to lie either to the right-hand side or to the left-hand side of the head 26a of the locking element. Elements 31 and 32 also cooperate with lever 20 to limit pivotal movement of shift bracket 12 by movement of lever 20. For example, in the position shown in FIG. 2, counterclockwise pivoting of shift bracket 12 by pivoting the shift lever 20 is prevented by engagement of shift lever 20 and element 31. Outside the neutral position, the bolt member 24 pivots past the head 26a of the locking element so that the shift bracket can be pivoted in any gear stage position.

Figure 2:
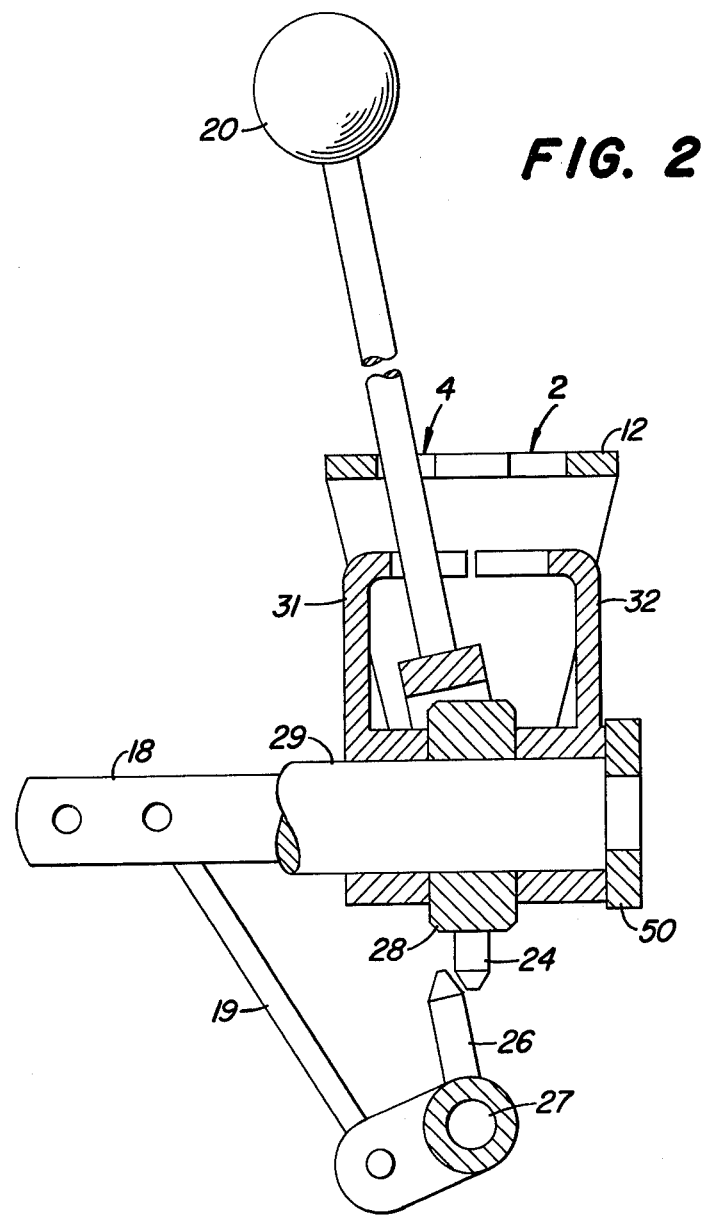
FIG. 2 shows a view in section through the shift device shown in FIG. 1.

The mode of operation of the locking element 26 will be more clearly seen from reference to FIG. 2.

FIG. 2 shows a view in vertical section of the construction shown in FIG. 1, the section being taken on the central plane of the mounting pin 29 and the arrangement being viewed from the front towards the rear. If, now, the shift lever 20 is to be moved into gear stage "3" (see FIG. 3), the following sequence is followed. The shift lever 20 is first pivoted about the pivot mounting 22 from the neutral position shown in FIG. 1, without the cooperating bolt member 24 initially changing in position. The shift lever 20 is now moved forwardly into gear position "3", with the cooperating bolt member 24 pivoting past the side of the locking element 26, as shown in FIG. 1. In FIG. 2, the bolt member 24 pivots into the plate of the drawing. With the arrangement in the above-mentioned gear position "3", the additional change-over shift function fast/slow can now be affected, as also in gear positions "1", "2" and "4", by pivoting the shift lever 20 towards the right (the directions are specified with reference to the view shown in FIG. 2). In this position "3", leftward pivoting of shift lever 20, and thus, of shift bracket 12, is prevented by shift segment 31. However, when shift lever 20 is pivoted to the right, it will engage the edge of guide slot 10 and cause shift bracket 12 to pivot to the right with lever 20, since bolt member 24 is no longer interferring with locking element 26. Normally, the shift bracket will be so arranged that it is in a horizontal position in the situation of one of the additional change-over shift functions, for example, "slow", while in the situation of the other change-over shift function, for example, "fast", the bracket is pivoted from the horizontal position at an inclined angle towards the left (away from the driver). This means that the locking element 26 also performs that movement by way of the lever arm 18 and the bar 19 so that in the neutral position, the locking element 26 is either to the left or to the right of the cooperating bolt member 24.

Figure 3:
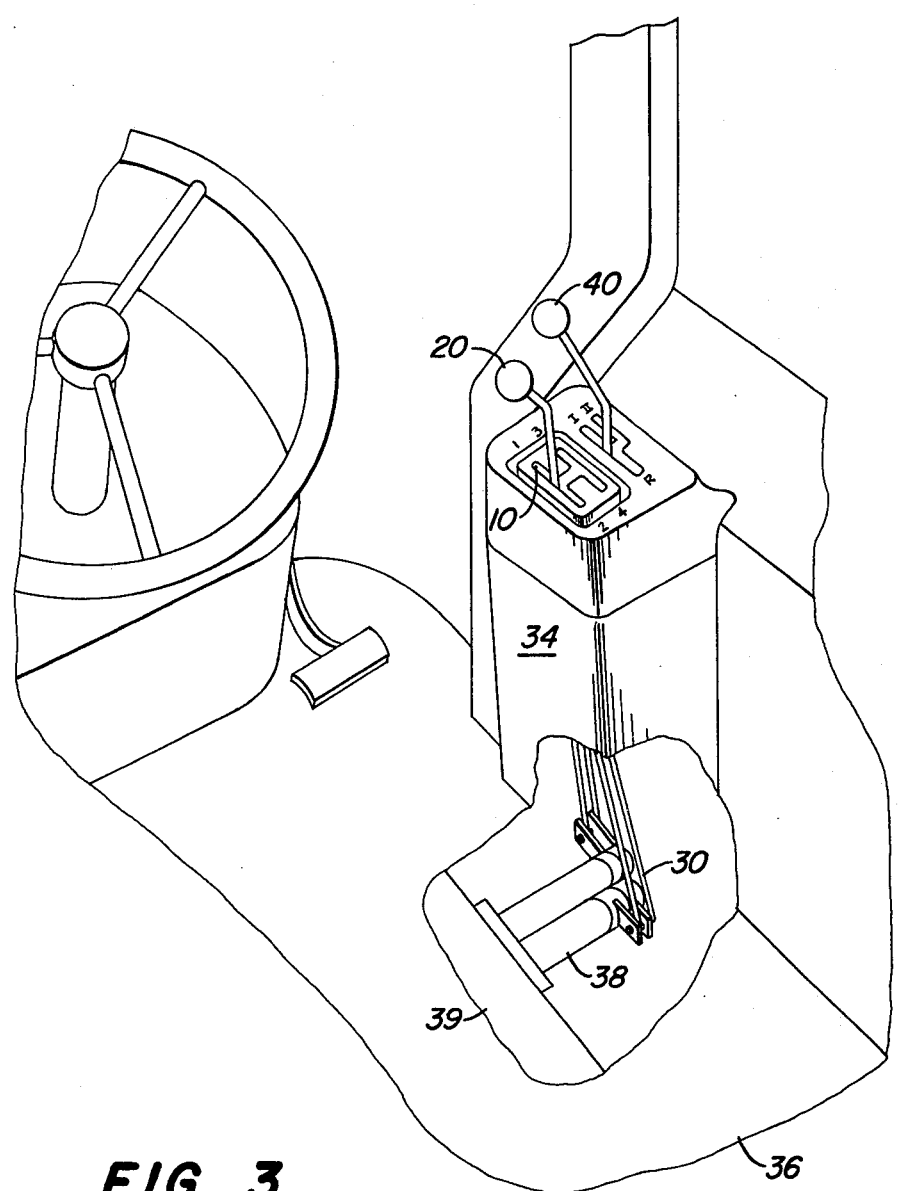
FIG. 3 shows an inside view of part of a driving cabin, with the shift device installed therein.

FIG. 3 seeks to give an impression of the possible use and installation of the shift device according to the invention. The view selected corresponds to a view into the open or closed driving cabin, for example, of an agricultural tractor. In the same way, as in the embodiment shown in FIGS. 1 and 2, the shift lever 20 is again designed for four shift gear stages, and the shift gate is therefore of H-shaped configuration. The shift lever or shift stage lever 20 is combined with a range shift lever or group shift lever 40 which is guided in an h-shaped shift gate whic is stationary. In the illustrated example, there are three groups, two forward groups of different speeds, and a reverse group. In all, therefore, there are $2 \times 4 = 8$ forward gears and $1 \times 4$ reverse gears. If the additional change-over shift function which is to be affected by pivoting the shift bracket or the shift gate 10 is a fast-slow function acting on the planetary drive, as in the embodiment shown in FIGS. 1 and 2, then the embodiment shown in FIG. 3 has a total of sixteen forward gears and eight reverse gears.

The casing 34, which is close to the wall, is broken away at one position in order to give a clear view on to the shift linkage means of which part is designated at reference numeral 30 and which, in turn, acts on the shift shafts 38 which are taken out of the transmission housing 39 towards the right-hand side, below the driving platform 36. The high-low load shift transmission can be shifted via rod 30 in each of the four shift lever positions, but not in neutral. The four gear stages are produced in known manner by two concentrically arranged double shafts, respectively. Not illustrated in the drawing is the linkage means for the additional change-over shift function which acts, for example, on the hydraulic valves of a planetary transmission which can be hydraulically shifted under load.

The shift device illustrated, therefore, integrates into the known 4-gear-H-shift principle, the shift action for an upstream-disposed load shift transmission, by means of a shift movement which is transverse with respect to the normal direction of shifting. This means that the number of operating levers required for this transmission design is reduced from 3 to 2, which, it will be seen, can be arranged compactly, one beside the other, to the right of the driving position, where they can be conveniently handled.

In practical operation, the driver selects one of the speed ranges I, II or R, while stationary, and engages the gear required for starting off. While travelling, it is then possible to select a total of eight gears, depending on operating conditions, with four gears being shifted on the H-shift principle, as in the case of a passenger vehicle, while permitting four gear intermediate stages to be selected by an additional transverse movement of the shift lever.

I claim:

1. A shift device for a vehicle drive with a shift lever having a primary shift function for shifting among stages of a multi-stage transmission, one of the stages being neutral and having a change-over shift function usable in all of the stages, the shift lever being mounted pivotally in two directions and being movable into and out of engagement with shift segments operatively connected to the transmission via shift members, characterized by:
   a shift bracket engageable with the shift lever, pivotal in response to movement of the shift lever and having guide slots for receiving and positively guiding the shift lever among the stages, the guide slots including a transverse extending branch and at least one fore-and-aft extending branch, the shift lever being movable to pivot the shift bracket in a direction parallel to the transverse extending branch when the shift device is in one of its non-neutral stages; and
   means for preventing the shift lever from pivoting the shift bracket in a direction parallel to the transverse extending branch when the shift device is in the neutral stage.

2. A shift device according to claim 1 characterized in that the transverse extending branch extends substantially parallel to a wheel axle of the vehicle and the fore-and-aft extending branches are oriented approximately parallel to the vehicle travel direction.

3. The shift device of claim 1 wherein the shift bracket comprises an inverted, substantially U-shaped form having a substantially horizontally extending upper portion in which the guide slots are formed and having a pair of limbs extending downwardly from the upper portion, the lower ends of the limbs having means for pivotally supporting the shift bracket.

4. The shift device of claim 3, wherein:
   the movement of the shift lever and bracket in said direction parallel to the transverse extending branch occurs about a common axis.

5. The shift device of claim 4, wherein:
   the common axis is oriented approximately horizontally in the vehicle direction of travel.

6. The shift device according to claim 4, characterized in that one of the downwardly extending limbs of the shift bracket is provided, transversely to the common axis, with a laterally extending lever arm which is fixedly connected to a shift linkage and which moves upwardly or downwardly therewith upon pivotal movement of the shift bracket to produce the change-over shift function.

7. The shift device of claim 1, wherein the pivoting preventing means comprises:
   a bolt member extending downwardly from the shift lever; and a locking element extending upwardly into the region of the bolt member from a mounting connected for pivotal movement with the shift bracket, the locking element and the bolt member being engageable with each other to prevent transverse pivoting of the shift bracket when the shift lever is in the neutral position.

8. The shift device of claim 7, wherein:

the shift lever is cardanically mounted via a mounting which includes a mounting element pivotal in a direction perpendicular to the transverse extending guide slot branch and pivotally coupled to the shift lever, the bolt member extending downwardly from the mounting element.

9. The shift device of claim 7, wherein the locking element mounting comprises:

a lever arm fixed with respect to and extending from the shift bracket; and a bar coupling the locking element to the lever arm for movement therewith.

* * * * *